US012784782B2

(12) United States Patent
Ramesh et al.

(10) Patent No.: US 12,784,782 B2
(45) Date of Patent: *Nov. 3, 2026

(54) ACTOR-REPLACEMENT SYSTEM FOR VIDEOS

(71) Applicant: Roku, Inc., San Jose, CA (US)

(72) Inventors: Sunil Ramesh, Cupertino, CA (US); Michael Cutter, Golden, CO (US); Karina Levitian, Austin, TX (US)

(73) Assignee: Roku, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/060,373

(22) Filed: Feb. 21, 2025

(65) Prior Publication Data

US 2025/0191614 A1 Jun. 12, 2025

Related U.S. Application Data

(63) Continuation of application No. 18/666,243, filed on May 16, 2024, now Pat. No. 12,260,882, which is a (Continued)

(51) Int. Cl.

*G11B 27/00* (2006.01)

*G06T 7/00* (2017.01)

(Continued)

(52) U.S. Cl.

CPC .............. *G11B 27/036* (2013.01); *G06T 7/00* (2013.01); *G06T 7/70* (2017.01); *G06T 2207/10016* (2013.01); *G06T 2207/30196* (2013.01)

(58) Field of Classification Search

CPC ......... G11B 27/00; G11B 27/036; G06T 7/70; G06T 2207/10016; G06T 2207/30196

(Continued)

(56) References Cited

U.S. PATENT DOCUMENTS

| | | | | |
|---|---|---|---|---|
| 11,582,519 B1 * | 2/2023 | Bhat | .................. | H04N 21/4666 |
| 2013/0330060 A1 * | 12/2013 | Seidel | .................... | H04N 5/262<br>386/280 |

(Continued)

FOREIGN PATENT DOCUMENTS

| | | |
|---|---|---|
| KR | 20080002291 A | 1/2008 |

OTHER PUBLICATIONS

John Son; DeepBrain AI to Debut AI Studios at the 2022 NAB Show; Apr. 6, 2022, 11:00 ET; 4 pgs; https://www.prnewswire.com/news/deepbrain-ai/.

(Continued)

*Primary Examiner* — Daquan Zhao

(74) *Attorney, Agent, or Firm* — McDonnell Boehnen Hulbert & Berghoff LLP

(57) ABSTRACT

In one aspect, an example method includes (i) estimating, using a skeletal detection model, a pose of an original actor for each of multiple frames of a video; (ii) obtaining, for each of a plurality of the estimated poses, a respective image of a replacement actor; (iii) obtaining replacement speech in the replacement actor's voice that corresponds to speech of the original actor in the video; (iv) generating, using the estimated poses, the images of the replacement actor, and the replacement speech, synthetic frames corresponding to the multiple frames of the video that depict the replacement actor in place of the original actor, with the synthetic frames including facial expressions for the replacement actor that temporally align with the replacement speech; and (iv) combining the synthetic frames and the replacement speech so as to obtain a synthetic video that replaces the original actor with the replacement actor.

18 Claims, 8 Drawing Sheets

Related U.S. Application Data continuation of application No. 18/349,551, filed on Jul. 10, 2023, now Pat. No. 12,014,753, which is a continuation of application No. 18/062,410, filed on Dec. 6, 2022, now Pat. No. 11,749,311.

(51) Int. Cl.
*G06T 7/70* (2017.01)
*G11B 27/036* (2006.01)

(58) Field of Classification Search
USPC .......................... 386/285, 278, 280, 282, 239
See application file for complete search history.

(56) References Cited

U.S. PATENT DOCUMENTS

| | | | |
|---|---|---|---|
| 2018/0025750 A1 | 1/2018 | Smith | |
| 2020/0084521 A1 | 3/2020 | Adler | |

OTHER PUBLICATIONS

Pose Detection | ML Kit | Google Developers; Pose Detection; Sep. 20, 2022; https://developers.google.com/ml-kit/vision/pose-detection.
Samsung's Neon 'artificial humans' are confusing everyone. We set the record straight; Aug. 23, 2022, 8:36 AM; pp. 1/16; https://www.cnet.com/tech/mobile/samsung-neon-artificial-humans-are-confusing-everyone-we-set-record-straight/.
Synthesia | #1 AI Video Generation Platform; Create professional videos in 60+ languages; Aug. 23, 2022, 8:33 AM; pp. 1/16; https://www.synthesia.io.
Vougioukas et al.; Realistic Speech-Driven Facial Animation with GANs; International Journal of Computer Vision (2020) 128:1398-1413; https://doi.org/10.1007/s11263-019-01251-8.
Sarkar et al., Neural Re-Rendering of Humans from a Singe Image, gvv.mpi-inf.mpg.de/projects/NHRR/.
Facebook's AI convincingly inserts people into photos | VentureBeat, Sep. 22, 2022, https://venturebeat.com/ai/facebooks-aiconvincingly-inserts-people-into-photos/.
Lee et al., Context-Aware Synthesis and Placement of Object Instances, 32nd Conference on Neural Information Processing Systems (NeurIPS 2018), Montréal, Canada.
Albadawy et al., Voice Conversion Using Speech-to-Speech Neuro-Style Transfer, Interspeech 2020, Oct. 25-29, 2020, Shanghai, China; pp. 4726-4730; http://dx.doi.org/10.21437/Interspeech.2020-3056.
Zhang et al., Learning to Speak Fluently in a Foreign Language: Multilingual Speech Synthesis and Cross-Language Voice Cloning, Google, arXiv:1907. Jul. 24, 201904448v2 [cs.CL] Jul. 24, 2019.
Ho et al., Cross-Lingual Voice Conversion With Controllable Speaker Individuality Using Variational Autoencoder and Star Generative Adversarial Network, date of publication Mar. 2, 2021, date of current version Apr. 1, 2021, Digital Object Identifier 10.1109/ACCESS.2021.3063519, IEEEAccess vol. 9, 2021 pp. 47503-47515; https://creativecommons.org/licenses/by/4.0/.
What is Cross-Language Voice Conversion and Why It's Important, reSpeecher, May 9, 2022 10:17:37 AM, downloaded Sep. 23, 2022, https://www.respeecher.com/blog/what-is-cross-language-voice-conversion-important.
Gafni et al., Dynamic Neural Radiance Fields for Monocular 4D Facial Avatar Reconstruction: CVPR 2021 open access, downloaded Dec. 6, 2022, https://openaccess.thecvf.com/content/CVPR2021/html/Gafni_Dynamic_Neural_Radiance_Fields_for_Monocular_4D_Facial_Avatar_Reconstruction_CVPR_2021_paper.html.
Elharrouss et al., "Image inpainting: A review", Department of Computer Science and Engineering, Qatar University, Doha, Qatar (2019).
Wang et al., "Few-shot Video-to-Video Synthesis", arXiv (Cornell University), Oct. 28, 2019, https://arixiv.org/pdf/1910.12713.pdf, retrieved Dec. 2, 2023.
Gururani et al., "SpaceX: Speech driven Portrait Animation with Controllable Expression", arXiv (Cornell University), Nov. 17, 2022, http://arxiv.org/pdf/2211.09809v1.pdf, retrieved Dec. 2, 2023.
Mirsky et al., "The Creation and Detection of Deepfakes: A Survey", ACM Computing Surveys, ACM, New York, NY, 54(1):1-41, Jan. 2, 2021.
Song, et al., "Talking Face Generation by Conditional Recurrent Adversarial Network", Proceedings of the TwentyEighth International Joint Conference on Artificial Intelligence, pp. 919-925, Jul. 25, 2019, http://arxiv.org/ pdf/1804.04786.pdf, retrieved Dec. 2, 2023.
Wang, "Few-shot Video-to-Video Synthesis (NeurIPS 2019)", Oct. 31, 2019, https://www.youtube/watch?v=8AZBuyEuDqc, retrieved Dec. 2, 2023.

* cited by examiner

ACTOR-REPLACEMENT SYSTEM FOR VIDEOS

PRIORITY

This application is a continuation of U.S. patent application Ser. No. 18/666,243 filed May 16, 2024, which is a continuation of U.S. patent application Ser. No. 18/349,551 filed Jul. 10, 2023, which is a continuation of U.S. patent application Ser. No. 18/062,410 filed Dec. 6, 2022, all of which are hereby incorporated by reference herein in their entirety.

USAGE AND TERMINOLOGY

In this disclosure, unless otherwise specified and/or unless the particular context clearly dictates otherwise, the terms "a" or "an" mean at least one, and the term "the" means the at least one.

SUMMARY

After a video is made, for a variety of reasons, it may be desirable to replace an actor in a scene of the video with another actor. For instance, after production, an executive team may decide to replace an actor with another actor. The executive team might make such a decision based on a belief that an audience may find the replacement actor more enjoyable and entertaining. Or the executive team might make such a decision based on knowledge that the original actor will be unavailable for future production. Unfortunately, however, re-recording a video with a replacement actor is time consuming and labor intensive.

Relatedly, after a video is made, it may be desirable to change the speech of an actor or multiple actors from one language to another. For instance, it may be desirable to change the dialogue of a video from an original language to a replacement language that is prevalent in a given geographic region. However, re-recording the dialogue for a video in another language and editing the video to include the re-recorded dialogue is time consuming and labor intensive. Moreover, even if the re-recorded audio is added to the video, the resulting video is likely to have undesirable lip synchronization issues. For instance, because the actor's lip movements correspond to the original audio, they would not be synchronized with re-recorded dialogue in the replacement language. Disclosed herein are systems and corresponding methods to address these and potentially other issues.

In one aspect, an example computing system is described. The computing system is configured for performing a set of acts including (i) estimating, using a skeletal detection model, a pose of an original actor for each of multiple frames of a video; (ii) obtaining, for each of a plurality of the estimated poses, a respective image of a replacement actor; (iii) obtaining replacement speech in the replacement actor's voice that corresponds to speech of the original actor in the video; (iv) generating, using the estimated poses, the images of the replacement actor, and the replacement speech, synthetic frames corresponding to the multiple frames of the video that depict the replacement actor in place of the original actor, with the synthetic frames depicting the replacement actor in respective poses that align with the estimated poses of the original actor in corresponding frames of the video, and with the synthetic frames including facial expressions for the replacement actor that temporally align with the replacement speech; and (iv) combining the synthetic frames and the replacement speech so as to obtain a synthetic video that replaces the original actor with the replacement actor.

In another aspect, an example method is described. The method includes estimating, by a computing system using a skeletal detection model, a pose of an original actor for each of multiple frames of a video; (ii) obtaining, by the computing system for each of a plurality of the estimated poses, a respective image of a replacement actor; (iii) obtaining, by the computing system, replacement speech in the replacement actor's voice that corresponds to speech of the original actor in the video; (iv) generating, by the computing system using the estimated poses, the images of the replacement actor, and the replacement speech, synthetic frames corresponding to the multiple frames of the video that depict the replacement actor in place of the original actor, with the synthetic frames depicting the replacement actor in respective poses that align with the estimated poses of the original actor in corresponding frames of the video, and with the synthetic frames including facial expressions for the replacement actor that temporally align with the replacement speech; and (iv) combining the synthetic frames and the replacement speech so as to obtain a synthetic video that replaces the original actor with the replacement actor.

In another aspect, a non-transitory computer-readable medium is described. The non-transitory computer-readable medium has stored thereon program instructions that upon execution by a computing system, cause performance of a set of acts. The set of acts include (i) estimating, using a skeletal detection model, a pose of an original actor for each of multiple frames of a video; (ii) obtaining, for each of a plurality of the estimated poses, a respective image of a replacement actor; (iii) obtaining replacement speech in the replacement actor's voice that corresponds to speech of the original actor in the video; (iv) generating, using the estimated poses, the images of the replacement actor, and the replacement speech, synthetic frames corresponding to the multiple frames of the video that depict the replacement actor in place of the original actor, with the synthetic frames depicting the replacement actor in respective poses that align with the estimated poses of the original actor in corresponding frames of the video, and with the synthetic frames including facial expressions for the replacement actor that temporally align with the replacement speech; and (iv) combining the synthetic frames and the replacement speech so as to obtain a synthetic video that replaces the original actor with the replacement actor.

DETAILED DESCRIPTION

I. Overview

Figure 1:
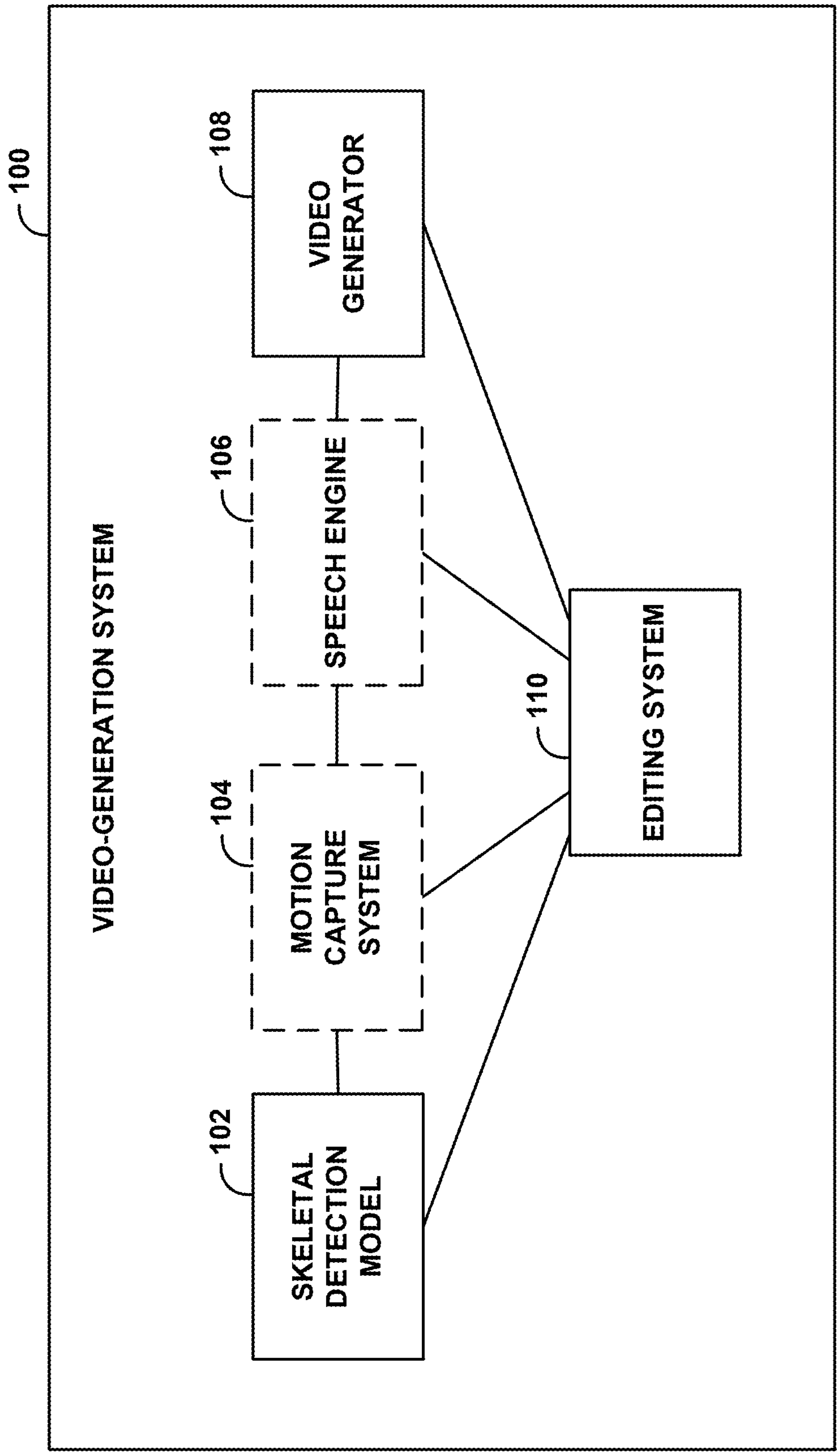
FIG. 1 is a simplified block diagram of an example video-generation system in which various described principles can be implemented.

After a video is made, for a variety of reasons, it may be desirable to replace an actor in a scene of the video with another actor. Likewise, it may be desirable to change the speech of an actor or multiple actors from one language to another. Disclosed herein are systems and corresponding methods to address these and potentially other issues.

In an example method, a computing system estimates a pose of an original actor for each of multiple frames of a video using a skeletal detection model. In some instances, the skeletal detection model detects and tracks skeletal landmarks over the course of a sequence of frames of the video. The skeletal landmarks corresponding to different body parts, and the relative positions of the skeletal landmarks changes for different poses. The computing system also obtains respective images of a replacement actor for each of a plurality of the estimated poses. In addition, the computing system obtains replacement speech in the replacement actor's voice that corresponds to speech of the original actor in the video. The replacement actor can be a real actor or a completely synthetic actor (i.e. an actor that does not actually exist in real life and is generated by a computing system) depending on the desired implementation.

Further, the computing system can then use the estimated poses of the original actor, the images of the poses of the replacement actor, and the replacement speech as a basis for generating synthetic frames that replace the original actor with the replacement actor. The synthetic frames depict the replacement actor in respective poses that align with the estimated poses of the original actor in corresponding frames of the video. The synthetic frames also include facial expressions for the replacement actor that temporally align with the replacement speech. In some instances, the computing system generates the synthetic frames in two steps. In a first step, the computing system inserts an image of the replacement actor into a frame of the video using the estimated pose of the original actor in the frame. In a second step, the computing system uses a video-synthesis model to determine the facial expressions that align with the replacement speech.

After generating the synthetic frames, the computing system (perhaps with input from an editor) can combine the synthetic frames with the replacement speech so as to obtain a synthetic video that replaces the original actor with the replacement actor. Combining the synthetic frames with the replacement speech can involve replacing the speech of the original actor with the replacement speech within an audio track of the video.

In another example method, a computing system generates a synthetic video that changes the language of speech of an actor of a video from an original language to a replacement language. As part of the method, the computing system obtains a target language and generates, using a speech engine, synthesized speech in the actor's voice that corresponds to the speech of the actor and is in the target language. In some instances, the speech engine includes a speech-to-speech voice modification model that uses the speech of the actor to generate the synthesized speech. The computing system then generates synthetic frames having facial expressions for the actor that temporally align with the synthesized speech. After generating the synthetic frames, the computing system or an editor combines the synthetic frames with the synthesized speech so as to obtain a synthetic video that changes the speech of the actor to the target language. Combining the synthetic frames with the synthesized speech can involve replacing the speech of the original actor with the synthesized speech within an audio track of the video.

Various other features of these systems and methods are described hereinafter with reference to the accompanying figures.

II. Example Architecture

A. First Example Video-Generation System

FIG. 1 is a simplified block diagram of an example video-generation system 100. The video-generation system 100 can include various components, such as a skeletal detection model 102, a motion capture system 104, a speech engine 106, a video generator 108, and an editing system 110. The video-generation system 100 can be configured to generate a synthetic video that replaces an original actor in a video with a replacement actor.

The video-generation system 100 can also include one or more connection mechanisms that connect various components within the video-generation system 100. For example, the video-generation system 100 can include the connection mechanisms represented by lines connecting components of the video-generation system 100, as shown in FIG. 1.

In this disclosure, the term "connection mechanism" means a mechanism that connects and facilitates communication between two or more components, devices, systems, or other entities. A connection mechanism can be or include a relatively simple mechanism, such as a cable or system bus, and/or a relatively complex mechanism, such as a packet-based communication network (e.g., the Internet). In some instances, a connection mechanism can be or include a non-tangible medium, such as in the case where the connection is at least partially wireless. In this disclosure, a connection can be a direct connection or an indirect connection, the latter being a connection that passes through and/or traverses one or more entities, such as a router, switcher, or other network device. Likewise, in this disclosure, communication (e.g., a transmission or receipt of data) can be a direct or indirect communication.

The video-generation system 100 and/or components thereof can take the form of a computing system, an example of which is described below.

In some instances, the video-generation system 100 can include multiple instances of at least some of the described components.

B. Second Example Video-Generation System

Figure 2:
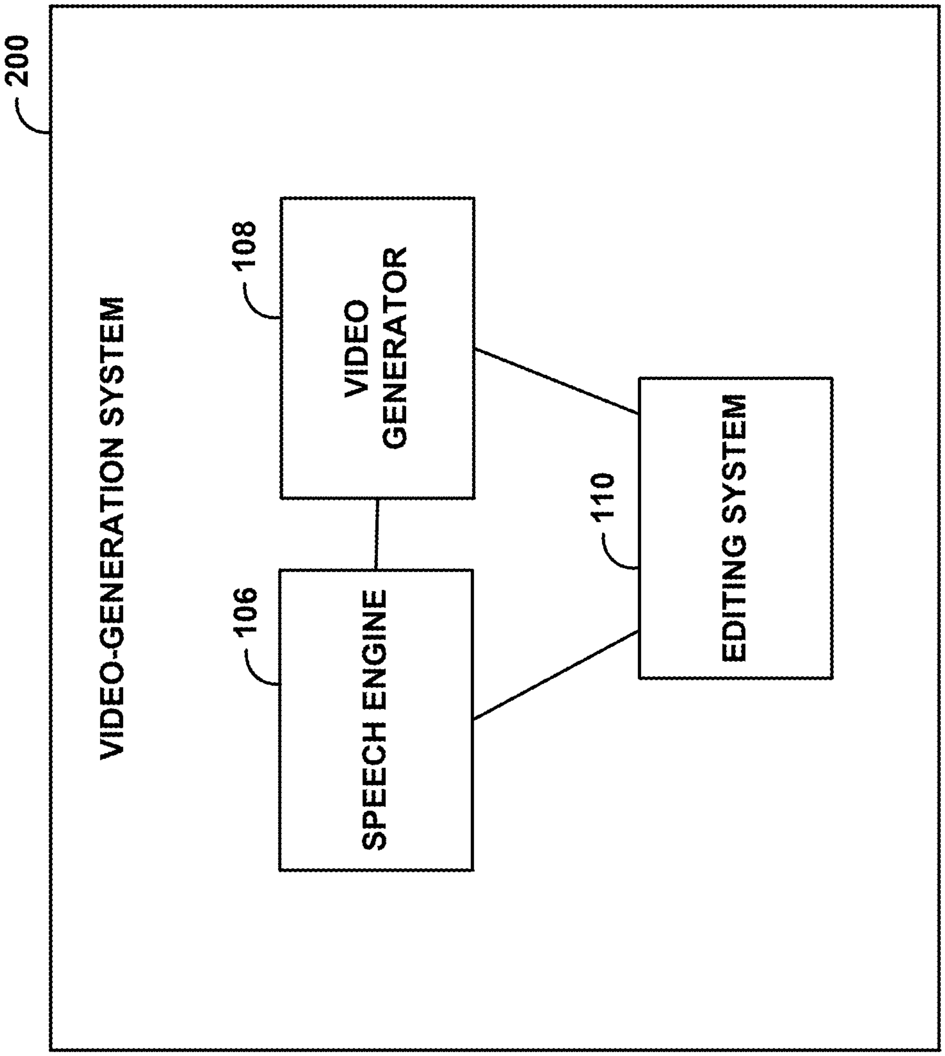
FIG. 2 is a simplified block diagram of another example video-generation system in which various described principles can be implemented.

FIG. 2 is a simplified block diagram of an example video-generation system 200. The video-generation system 200 can include various components, such as the speech engine 106, the video generator 108, and the editing system 110. The video-generation system 200 can be configured to generate a synthetic video that changes the language of speech of an actor from an original language to a target language.

The video-generation system 200 can also include one or more connection mechanisms that connect various components within the video-generation system 200. For example, the video-generation system 200 can include the connection mechanisms represented by lines connecting components of the video-generation system 200, as shown in FIG. 2.

The video-generation system 200 and/or components thereof can take the form of a computing system, an example of which is described below.

In some instances, the video-generation system 200 can include multiple instances of at least some of the described components.

C. Computing System

Figure 3:
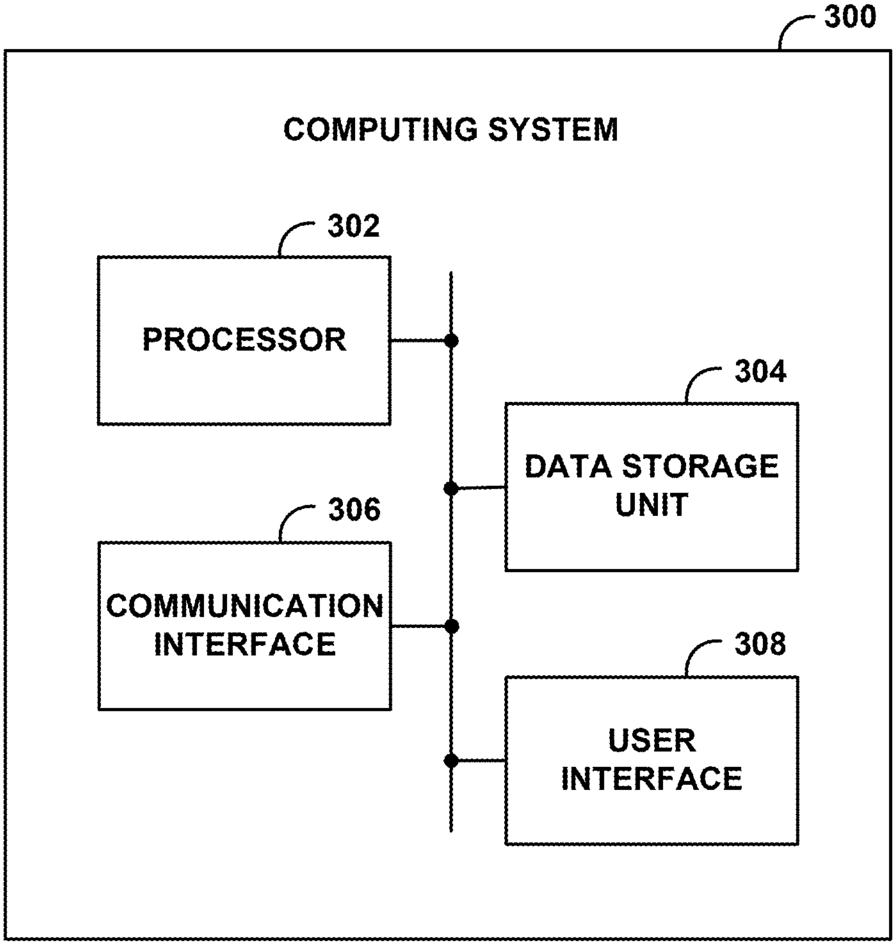
FIG. 3 is a simplified block diagram of an example computing system in which various described principles can be implemented.

FIG. 3 is a simplified block diagram of an example computing system 300. The computing system 300 can be configured to perform and/or can perform one or more operations, such as the operations described in this disclosure. The computing system 300 can include various components, such as a processor 302, a data-storage unit 304, a communication interface 306, and/or a user interface 308.

The processor 302 can be or include a general-purpose processor (e.g., a microprocessor) and/or a special-purpose processor (e.g., a digital signal processor). The processor 202 can execute program instructions included in the data-storage unit 304 as described below.

The data-storage unit 304 can be or include one or more volatile, non-volatile, removable, and/or non-removable storage components, such as magnetic, optical, and/or flash storage, and/or can be integrated in whole or in part with the processor 302. Further, the data-storage unit 304 can be or include a non-transitory computer-readable storage medium, having stored thereon program instructions (e.g., compiled or non-compiled program logic and/or machine code) that, upon execution by the processor 302, cause the computing system 300 and/or another computing system to perform one or more operations, such as the operations described in this disclosure. These program instructions can define, and/or be part of, a discrete software application.

In some instances, the computing system 300 can execute program instructions in response to receiving an input, such as an input received via the communication interface 306 and/or the user interface 308. The data-storage unit 304 can also store other data, such as any of the data described in this disclosure.

The communication interface 306 can allow the computing system 300 to connect with and/or communicate with another entity according to one or more protocols. Therefore, the computing system 300 can transmit data to, and/or receive data from, one or more other entities according to one or more protocols. In one example, the communication interface 206 can be or include a wired interface, such as an Ethernet interface or a High-Definition Multimedia Interface (HDMI). In another example, the communication interface 206 can be or include a wireless interface, such as a cellular or WI-FI interface.

The user interface 308 can allow for interaction between the computing system 300 and a user of the computing system 300. As such, the user interface 308 can be or include an input component such as a keyboard, a mouse, a remote controller, a microphone, and/or a touch-sensitive panel. The user interface 308 can also be or include an output component such as a display device (which, for example, can be combined with a touch-sensitive panel) and/or a sound speaker.

The computing system 300 can also include one or more connection mechanisms that connect various components within the computing system 300. For example, the computing system 300 can include the connection mechanisms represented by lines that connect components of the computing system 300, as shown in FIG. 3.

The computing system 300 can include one or more of the above-described components and can be configured or arranged in various ways. For example, the computing system 300 can be configured as a server and/or a client (or perhaps a cluster of servers and/or a cluster of clients) operating in one or more server-client type arrangements, for instance.

As noted above, the video-generation system 100, components of the video-generation system 100, the video-generation system 200, and/or components of the video-generation system 200 can take the form of a computing system, such as the computing system 300. In some cases, some or all these entities can take the form of a more specific type of computing system, such as a desktop computer, a laptop, a tablet, a mobile phone, among other possibilities.

III. Example Operations

The video-generation system 100, components of the video-generation system 100, the video-generation system 200, and/or components of the video-generation system 200 can be configured to perform and/or can perform one or more operations. Examples of these operations and related features will now be described with reference to FIGS. 4-6.

A. Operations Related to Estimating a Pose of an Actor

For context, general operations and examples related to the skeletal detection model 102 and the editing system 110 will now be described. To begin, the skeletal detection model 102 obtains frames of a video. For example, the video can be a movie or a television show, and the frames can include a portion of the video or the entire video.

The skeletal detection model 102 can be configured to estimate the pose of an original actor in different respective frames of the video. By way of example, the skeletal detection model 102 can include a machine learning model that uses image analysis to detect and identify the position of an actor's body in a frame using a set of skeletal landmarks. Each skeletal landmark can correspond to a different body part, such as a shoulder, hip, arm, length, facial feature, etc.

The skeletal detection model 102 can take any of a variety of forms depending on the desired implementation. One example of a skeletal detection model is BlazePose developed by Google AI, which outputs pose information in the form of the pixel positions of 33 skeletal landmarks. Other examples include MoveNet and PoseNet provided by TensorFlow.

Figure 4:
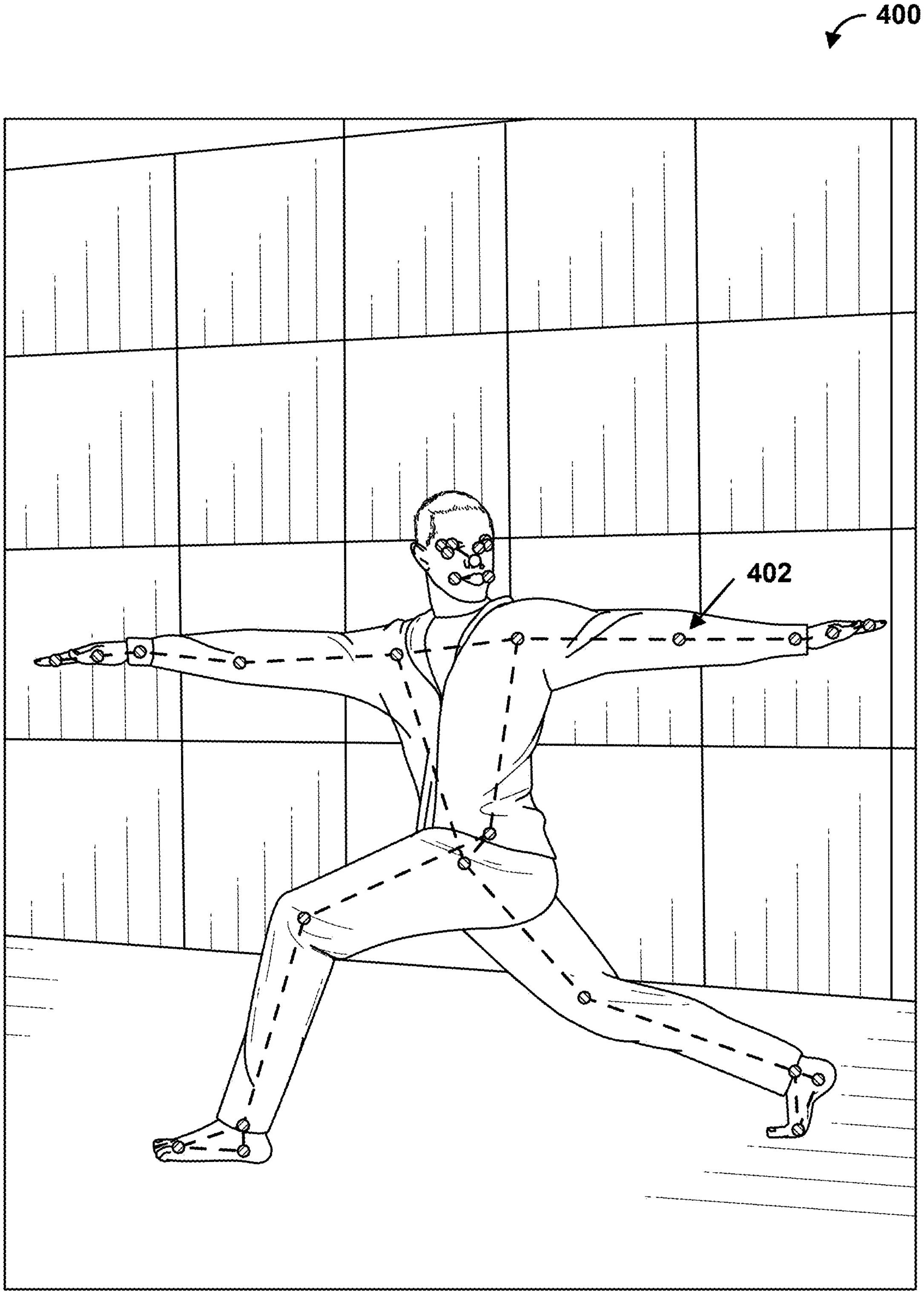
FIG. 4 is a conceptual illustration of an estimated pose of an actor.

FIG. 4 is conceptual illustration 400 of an estimated pose of an actor of a video. The estimated pose is defined by the relative positions of a set of skeletal landmarks 402. As shown in FIG. 4, each skeletal landmark 402 represents a respective location of a body part. The skeletal landmarks 402 are provided by way of example. The number and corresponding body parts are not meant to be limiting.

The editing system 110 can include a computing system that allows a user to review an estimated pose output by the skeletal detection model 102 as part of a quality assurance process. For instance, the editing system 110 can present a frame and skeletal landmarks defining an estimated pose on a display, and a user of the editing system 110 can approve or reject the estimated pose using a user interface of the editing system 110. Alternatively, the user can use editing system to adjust the locations of one or more skeletal landmarks output by the skeletal detection model 102.

B. Operations Related to Obtaining Images of a Replacement Actor

For context, general operations and examples related to the skeletal detection model 102, motion capture system 104, and editing system 110 will now be described.

In some examples, the video-generation system 100 obtains a sample video of a replacement actor, and estimates the pose of the replacement actor in each of multiple frames of the video using the skeletal detection model 102.

Additionally or alternatively, the motion capture system 104 can be used to obtain images of the replacement actor having corresponding pose information. For instance, the motion capture system 104 can include a motion capture suit that is worm by the replacement actor while a camera records a video of the replacement actor in front of a green screen as the replacement actor performs a variety of poses. With this approach, data from sensors on the motion capture suit is linked with frames of the video, such that images of the replacement actor are associated with skeletal landmarks defining poses of the replacement actor.

A user can use the editing system 110 to review, approve, and/or edit images of the replacement actor and corresponding poses as part of a quality assurance process.

C. Operations Related to Replacement Speech

For context, general operations and examples related to the speech engine 106 and the editing system 110 will now be described. In addition to replacing images of the original actor with images of the replacement actor, the video-generation system 100 can be utilized to replace speech of the original actor with speech of the replacement actor. The speech of the replacement actor, or replacement speech, is in the replacement actor's voice and corresponds to the speech of the original actor. For instance, the replacement speech can include the same words that are spoken by the original actor. In some examples, the replacement speech is in the same language as the speech of the original actor. In other examples, the replacement speech is in a different language than the speech of the original actor.

Similarly, the video-generation system 200 can be utilized to replace speech of the original actor with speech of the replacement actor, with the replacement speech being in a different language than the language of the speech of the original actor.

In some instances, the video-generation system 100 obtains a recording of replacement speech that is captured (e.g., in a recording studio) as the replacement actor speaks the replacement speech. In other instances, the speech engine 106 generates synthesized speech in the replacement actor's voice that corresponds to speech of the original actor in the video.

The speech engine 106 can take any of variety of forms depending on the desired implementation. As one example, the speech engine can include a speech-to-speech voice conversion model that receives as input the speech of the original actor and a speech sample for the replacement actor, and generates synthesized speech in the replacement actor's voice that corresponds to the speech of the original actor. One example of a speech-to-speech voice modification model is the speech-to-speech neuro-style transfer described by AlBadawy et al. ("Voice Conversion Using Speech-to-Speech Neuro-Style Transfer"). That approach uses a combination of a variational auto-encoder and a generative adversarial network followed by a WaveNet-based encoder. The model receives an input speech signal, converts the input speech signal to a mel-spectrogram representation, and converts the mel-spectrogram representation to an output mel-spectrogram with the style of the target speaker. The output mel-spectrogram is then fed to a vocoder, which outputs a speech signal in the time domain.

As another example, the speech engine 106 can include a cross-language speech-to-speech voice conversion model that receives as input the speech of the original actor and a speech sample for the replacement actor, and outputs synthesized speech in the replacement actor's voice and the target language. For instance, the original actor's speech may be in English, and the synthesized speech may be Spanish spoken in the replacement actor's voice. One example of a cross-language speech-to-speech voice conversion model is the cross-lingual voice conversion model described by Ho et al. ("Cross-Lingual Voice Conversion With Controllable Speaker Individuality Using Variational Autoencoder and Star Generative Adversarial Network").

As still another example, the speech engine 106 can include a text-to-speech model that transforms text into synthesized speech in the replacement actor's voice. For instance, the text-to-speech engine can receive as input a transcript of the original actor's speech and output synthesized speech that speaks the text in the replacement actor's voice.

The text-to-speech model can take any of a variety of forms depending on the desired implementation. By way of example, the text-to-speech engine model can include a deep learning-based synthesis model that uses deep neural networks (DNNs) to produce artificial speech from text. The deep learning-based synthesis model can be trained using training data that includes recorded speech and the associated input text. Examples of deep learning-based synthesis models include WaveNet developed by DeepMind, Tacotron developed by Google, and VoiceLoop developed by Facebook.

In some examples, the speech engine 106 obtains a speech sample for the replacement actor, and transforms input text into synthesized speech using the speech sample. For instance, a deep learning-based synthesis model can use pre-trained speaker verification models as speaker encoders to extract speaker embeddings from a speech sample for the replacement actor. Extracting the speaker embeddings allows the deep learning-based synthesis model to learning the style and characteristics of the replacement actor, so that the synthesized speech output by the deep learning-based synthesis model sounds like the replacement actor. The speech sample can be audio extracted from a sample video.

The synthesized speech can be in the same language or a different language from the input text. The speech engine 106 can use a cross-lingual text-to-speech engine to convert the text in a first language to synthesized speech in a replacement language. One example of a cross-lingual text-to-speech engine is the multispeaker, multilingual text-to-speech synthesis model described by Zhang et al. ("Learning to Speak Fluently in a Foreign Language: Multilingual Speech Synthesis and Cross-Language Voice Cloning"). In some examples, the speech engine 106 transforms the text corresponding to the speech of the original actor into modified text that suits the replacement actor. For instance, local colloquialisms influence speech ("eh" in Canadian, etc.). The speech engine 106 can include a transformer that captures nuances introduced by local colloquialisms and generates modified text in accordance with the geographical region of the replacement actor.

The editing system 110 allows a user to review the replacement speech and/or the synthesized speech output by the speech engine 106 as part of a quality assurance process. For instance, the editing system 110 can playback the replacement speech or synthesized speech, and a user of the editing system 110 can approve or reject replacement speech or synthesized speech. Additionally or alternatively, a user can use the editing system to adjust the alignment between: the replacement speech or the synthesized speech, and the speech of the original actor in the video. For instance, a user can use the editing system to insert pauses or breaks in the replacement speech or the synthesized speech.

D. Operations Related to Object Insertion

In some examples, the video generator 108 uses one or more images of the replacement actor and estimated poses of the original actor in frames of the video to generate synthetic frames. By way of example, for a given frame of the multiple frames, the video generator 108 can insert, using an object insertion model, an image of the replacement actor into the given frame at a location indicated by the estimated pose of the original actor so as to obtain a modified frame. The image of the replacement actor can be an image of the replacement actor in the estimated pose.

Figure 5:
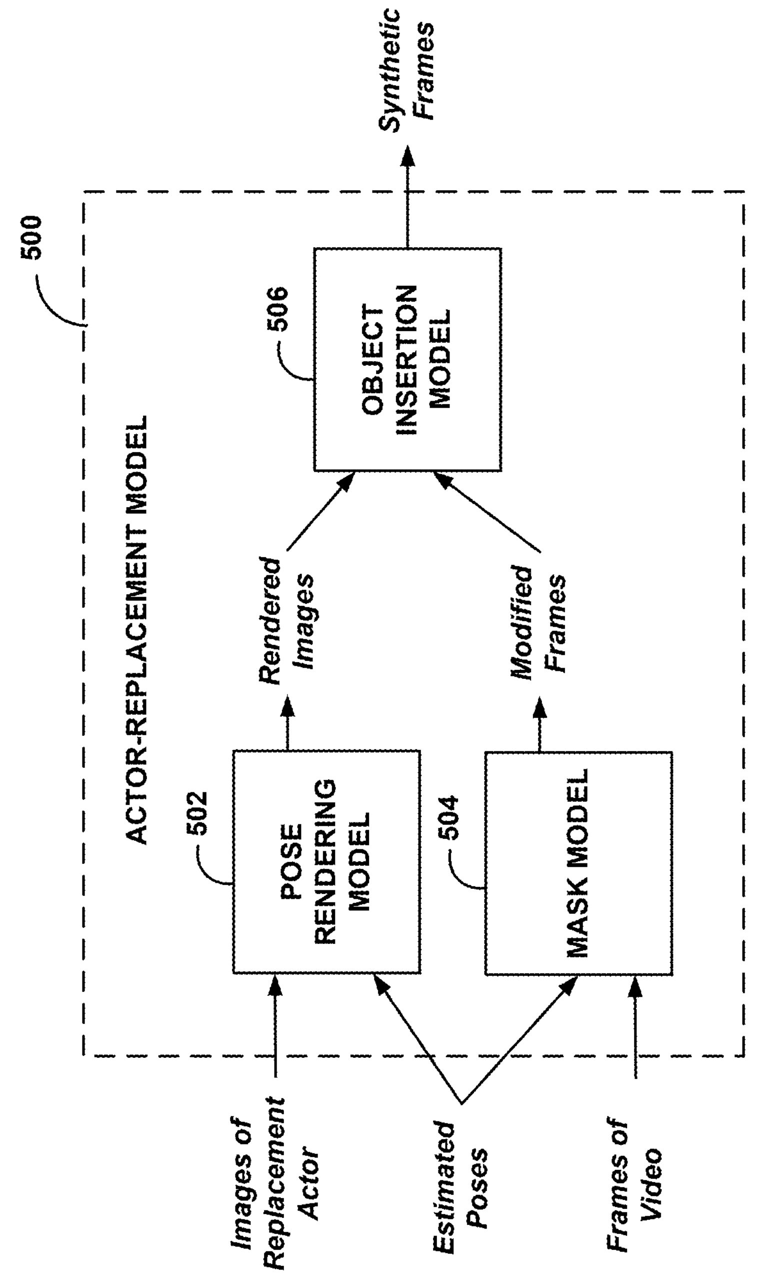
FIG. 5 is a simplified block diagram of an example actor-replacement model.

In some instances, the video generator 108 uses an actor-replacement model to generate the synthetic frames. FIG. 5 is a simplified block diagram of an example actor-replacement model 500. The actor-replacement model includes a pose rendering model 502, a mask model 504, and an objection insertion model 506.

As shown in FIG. 5, for each of multiple frames of a video, the pose rendering model 502 receives as input an image of the replacement actor and an estimated pose of the original actor. The pose rendering model 502 then outputs an image of the replacement actor in the estimated pose.

The pose rendering model 502 can take any of a variety of forms, depending on the desired implementation. As one example, the pose rendering model 502 can use a neural re-rendering approach that allows synthesis of an image of the replacement actor in different poses using an input image of the replacement actor. Such an approach is described by Sarkar et al. ("Neural Re-Renderings of Humans from a Single Image"). Briefly, the approach involves extracting a UV texture map of an underlying parametric body mesh model for regions visible in an image of the replacement actor; converting the partial UV texture map to a full UV texture map; re-posing the parametric body mesh using a target pose (the estimated pose of the original actor); texturing the parametric body mesh in the target pose with the UV feature map; and converting the textured parametric body mesh to a realistic image using a generative adversarial network (based on Pix2PixHD).

In another example, the pose rendering model 502 can additionally or alternatively use a monocular 4D facial reconstruction model that allows for using a monocular portrait video sequence of a person (or individuals frames/images of that video) to reconstruct a dynamic neural radiance field representing a 4D facial avatar, which allows for synthesizing novel head poses for the replacement actor as well as changes in facial expressions. Such an approach is described by Gafni et al. ("Dynamic neural radiance fields for monocular 4D facial avatar reconstruction.").

Among other things, these techniques can allow the pose rendering model 502 to extrapolate from some body/facial configurations of the replacement actor to an unseen target facial/body configuration.

These and/or other approaches can be extended to allow the pose rendering model 502 to render the replacement actor with different clothing obtained from another reference image. This is accomplished by extracting textures of body regions of the image of the reference actor (e.g., face, hands, and regions without garments) and extracting a partial UV texture map from garment regions of the other reference image. The textures of the body regions and the textures of the garment regions are then merged to texture the parametric body mesh. The other reference image can be an image of the original actor from the video. Hence, the rendered image of the replacement actor can be in the same pose as the original actor and with the same clothing as the original actor.

In examples in which the video-generation system 100 can access multiple images of the replacement actor that correspond to different poses, the video generator 108 can select an image of the replacement actor having a pose that is similar to the estimated pose of the original actor for use as input to the pose rendering model 502.

As further shown in FIG. 5, for each of the multiple frames of the video, the mask model 504 receives as input an estimated pose of the original actor in a frame of the video and the corresponding frame of the video. The mask model 504 then uses the estimated pose of the original actor to extract the original actor from the frame of the video, and output a modified frame. For instance, the mask model 504 can use the estimated pose to determine a silhouette of the original actor, and removing the image data intersecting with the silhouette from the frame of the video. In some instances, the mask model 504 uses an inpainting model to fill in the frame of the video from which the original actor was removed. Indeed, in situations where the replacement actor is larger (e.g., in height or width) than the source actor, the replacement actor can render over and occlude the background. However, if the replacement actor is smaller, an inpainting technique can be employed to extrapolate the likely background scene to fill in the missing pixels by replacing the larger source actor with the smaller replacement actor. One example of an inpainting model is a vanilla convolutional neural network inpainting model that learns to fill missing holes in an image. Other examples of inpainting models are described by Elharrouss et al. ("Image inpainting: A review").

As further shown in FIG. 5, for each of the multiple frames of the video, the objection insertion model 506 receives a rendered image of a replacement actor in the estimated pose of the original actor as well as a modified frame of the video from which the original actor has been removed. The object insertion model 506 then inserts the rendered image of the replacement actor into the modified frame of the video at the location of the original actor in the frame.

In some instances, the object insertion model 506 includes a generative adversarial network including a generator that produces sample synthetic frames that combine the rendered image of the replacement actor and the modified frame of the video from which the original actor has been removed, and one or more discriminators that attempt to distinguish between the generated sample synthetic frames and real-world images.

E. Operations Related to Facial Expression Synchronization

In some examples, video generator 108 uses a video-synthesis model to generating synthetic frames in which the replacement actor's facial expressions temporally align with the replacement speech. By way of example, the video-synthesis model can include a temporal generative adversarial network that includes multiple discriminators that cooperate to perform a spatial-temporal integration of synthetic frames for the video and the replacement speech. The synthetic frames can include the frames output by the actor-replacement model 500.

Figure 6:
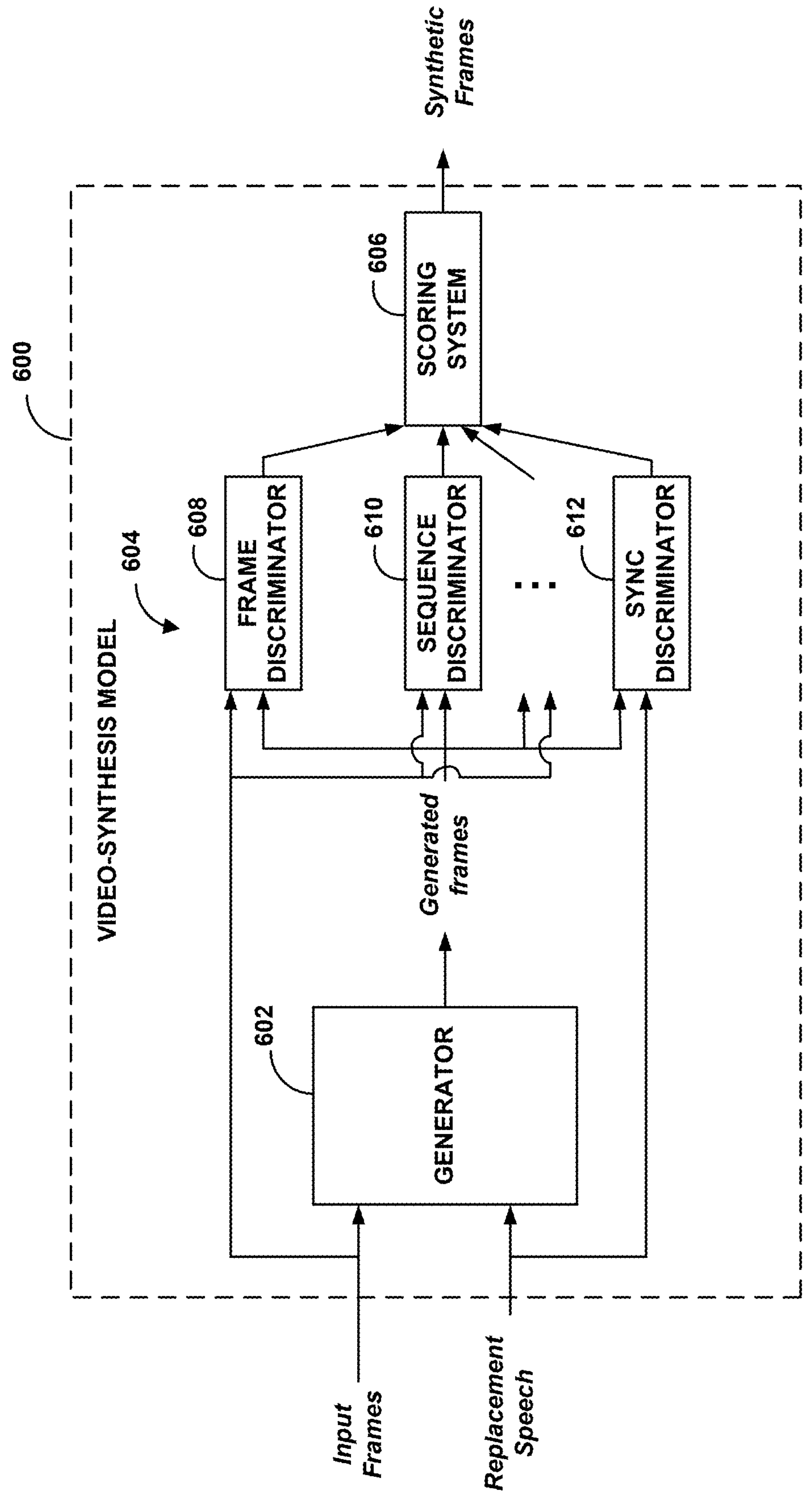
FIG. 6 is a simplified block diagram of an example video-synthesis model.

FIG. 6 is a simplified block diagram of an example video-synthesis model 600. As shown in FIG. 6, the video-synthesis model 600 includes a generator 602, an ensemble of discriminators 604, and a scoring system 606.

The generator 602 receives as input synthetic frames depicting the replacement actor as well as replacement speech. The generator 602 has an encoder-decoder structure and includes a content encoder, identity encoder, and a noise generator, and frame decoder. In one example, the replacement actor's identity (e.g., facial expressions and, optionally, gestures) is encoded by the identity encoder using a first convolutional neural network (CNN) that converts an input frame into a first latent space representation. In some instances, as part of the conversion, the generator 602 focuses on a region corresponding to the replacement actor's face. Additionally, an audio frame (e.g., 0.2 seconds) of the replacement speech is encoded by the content encoder using a second CNN that converts the audio frame into a second latent space representation. The frame decoder then combines the first latent space representation, the second latent space representation, and noise generated by the noise generator into a latent representation for a generated frame. This process is repeated for different audio frames and corresponding synthetic image frames to generate multiple generated frames.

The ensemble of discriminators 604 includes multiple discriminators that allow for generation of difference aspects of videos. By way of example, as shown in FIG. 6, the ensemble of discriminators 604 includes a frame discriminator 608, a sequence discriminator 610, and a synchronization discriminator 612.

The frame discriminator 608 distinguishes between real and synthetic frames using adversarial training. For example, the frame discriminator 608 can include a CNN that determines, at a frame-level whether a generated frame, from the generator 602, is realistic in terms of facial expressions and, optionally, gestures. The frame discriminator 608 can be trained using frames from a sample video of the replacement actor speaking. The frame discriminator 608 can output a score indicative of whether a generated frame is realistic.

The sequence discriminator 610 determines whether a sequence of generated frames is real or synthetic using adversarial training. For example, the sequence discriminator 610 can include a CNN with spatial-temporal convolutions that extracts and analyzes movements across generated frames of the sequence. The sequence discriminator 610 can be trained using sequences of frames from the sample video of the replacement actor speaking. The sequence discriminator 610 can output a score indicative of whether a sequence of frames is realistic.

The ensemble of discriminators 604 can also include other types of discriminators that allow for generating other aspects at the frame or sequence of frames level.

Finally, the synchronization discriminator 612 determines whether the generated frames are in or out of synchronization with a corresponding portion of the replacement speech. For example, the synchronization discriminator 612 can include an audio encoder that computes an audio embedding, a video encoder that computes a video embedding, and a distance calculator that computes a Euclidian distance between the embeddings as a measure of synchronization. The synchronization discriminator 612 can be trained using corresponding audio portions and sequences of frames from the sample video of the replacement actor speaking. The synchronization discriminator 612 can output a score indicative of whether the synchronization between the replacement speech and the generated sequence of frames is realistic.

The scoring system 606 utilizes scores output by the ensemble of discriminators to determine whether to render the generated frames as a synthetic video. For instance, the scoring system 606 can be configured to determine a weighted average of scores about by the frame discriminator 608, the sequence discriminator 610, and the synchronization discriminator 612 and compare the weighted average to a threshold. Based on determining that the weighted average exceeds a threshold, the scoring system can output data indicative of an approval to use the generated frames for use in rendering a synthetic video. Whereas, based on determining that the weighted average does not exceed the threshold, the scoring system can output data that rejects the generated synthetic frames, and optionally, causes the video-synthesis model 600 to continue to generate new frames in an effort to achieve more realistic synthetic frames. As such, in some examples, the scoring system 606 servers as a gatekeeper that regulates whether or not the generated frames look realistic enough to merit rendering a synthetic video using the generated frames.

Alternatively, the scoring system 606 can be configured to compare scores output by individual discriminators of the ensemble of discriminators 404 to respective thresholds. Upon determining that the scores output by each of the discriminators of the ensemble of discriminators 604 exceeds a respective threshold, the scoring system can output data indicative of an approval to use the generated frames for use in rendering a synthetic video.

In some examples, a user uses the editing system 110 to review the synthetic frames output by the video-synthesis model. For instance, a user can select, via a user interface of the editing system 110, a portion of the synthetic frames for re-generation by the video generator 108.

In some examples, video generator 108 uses a video-synthesis model to generate synthetic frames in which the original actor of a video has facial expressions that temporally align with replacement speech in another language. For example, the video generator 108 can use the video-synthesis model 600 in a manner similar to that described above, with the exception that the input frames are frames of the video that depict the original actor instead of synthetic frames that depict a replacement actor.

F. Operations Related to Audio Editing

In some examples, the video generator 108 combines the synthetic frames output by the video-synthesis model 600 and the replacement speech so as to obtain a synthetic video. In the actor-replacement use case, the synthetic video replaces the original actor with the replacement actor. On the other hand, in the language conversion use case, the synthetic video replaces the speech of the original actor with replacement speech in another language, and adjusts the original actor's facial expressions for consistency with the replacement speech.

Combining the synthetic frames with the replacement speech can involve modifying an audio track of the video to replace speech of the original actor with the replacement speech. This can be accomplished using a manual, semi-automated, or automated process. For instance, in some examples, a user uses the editing system 110 to extract the speech of the original actor from the audio track, and layer the replacement speech into the audio track. In some instances, the original speech for the audio track of the video is contained in a separate audio track or is tagged within the audio track such the original speech can be isolated from the audio track.

In some examples, the editing system can isolate and/or remove the speech of the original actor by employing any speech isolation and/or removal technique now known or later discovered. Example techniques includes those describe in KR20080002291 entitled "Voice deleting device and method from original sound" and US 2020/0084521 entitled "Automatic personal identifiable information removal from audio."

G. Operations Related to Replacement Actor Selection

The computing systems and techniques described above can be used to replace one more actors in a video with replacement actors. In some examples, a user specifies which actor of a video to replace and/or which replacement actor to use for the replacement(s) via a user interface of a media player, television, tablet, computer, or other device. For instance, for a given video, the user interface can provide a list of actor(s) that are replaceable. Further, for any of the actors that are replaceable, the user interface can provide a list of replacement actors. With this approach, a user can use such a user interface to provide data indicative of a selection of a replacement actor, from among a plurality of replacement actors, for an original actor of a video. Based on receiving such data, the video-generation system 100 can generate a synthetic video that replaces the original actor with the selected replacement actor.

Additionally or alternatively, in some examples, a computing system (e.g., the video-generation system 100 or another computing system) can obtain one or more user attributes of a viewer of a video, and the computing system can use the user attributes as a basis for selecting the replacement actor from among a plurality of replacement actors. Based on receiving such data, the video-generation system 100 can generate a synthetic video that replaces the original actor with the selected replacement actor.

The one or more user attributes can include a demographic attribute (e.g., an age, gender, geographic location, etc.). Additionally or alternatively, the one or more user attributes can include a viewing history specifying videos previously viewed by the viewer. With this approach, the computing system can select the replacement actor based on feedback or records indicating that other viewers having user attributes similar to the viewer selected that same replacement actor.

H. Operations Related to Storyline Changes

The computing systems and techniques described above can be used to change a characteristic of an original actor via a storyline change. For example, a producer/director may generate a storyline change in which a character develops a scar or limp as a result of a fight. For consistency with this storyline change, all scenes beyond a particular time in the storyline should reflect the change.

To accomplish this type of pipeline, the computing system can obtain, for each of a plurality of estimated poses of the original actor in a video, a respective modified image of the original actor (e.g., an image in which the original actor includes a scar resulting from the fight). Further, the computing system can then generate, using estimated poses of the original actor and the modified images of the original actor, synthetic frames corresponding to multiple frames of the video that depict the original actor in poses that align with the estimated poses of the original actor in corresponding frames of the video. The synthetic frames can depict the original actor with a modified appearance in accordance with the storyline change. This process is similar to the process described above, with the exception that rather than replacing the original actor with a replacement actor, the appearance of the original actor is instead modified in accordance with the storyline change.

I. First Example Method

Figure 7:
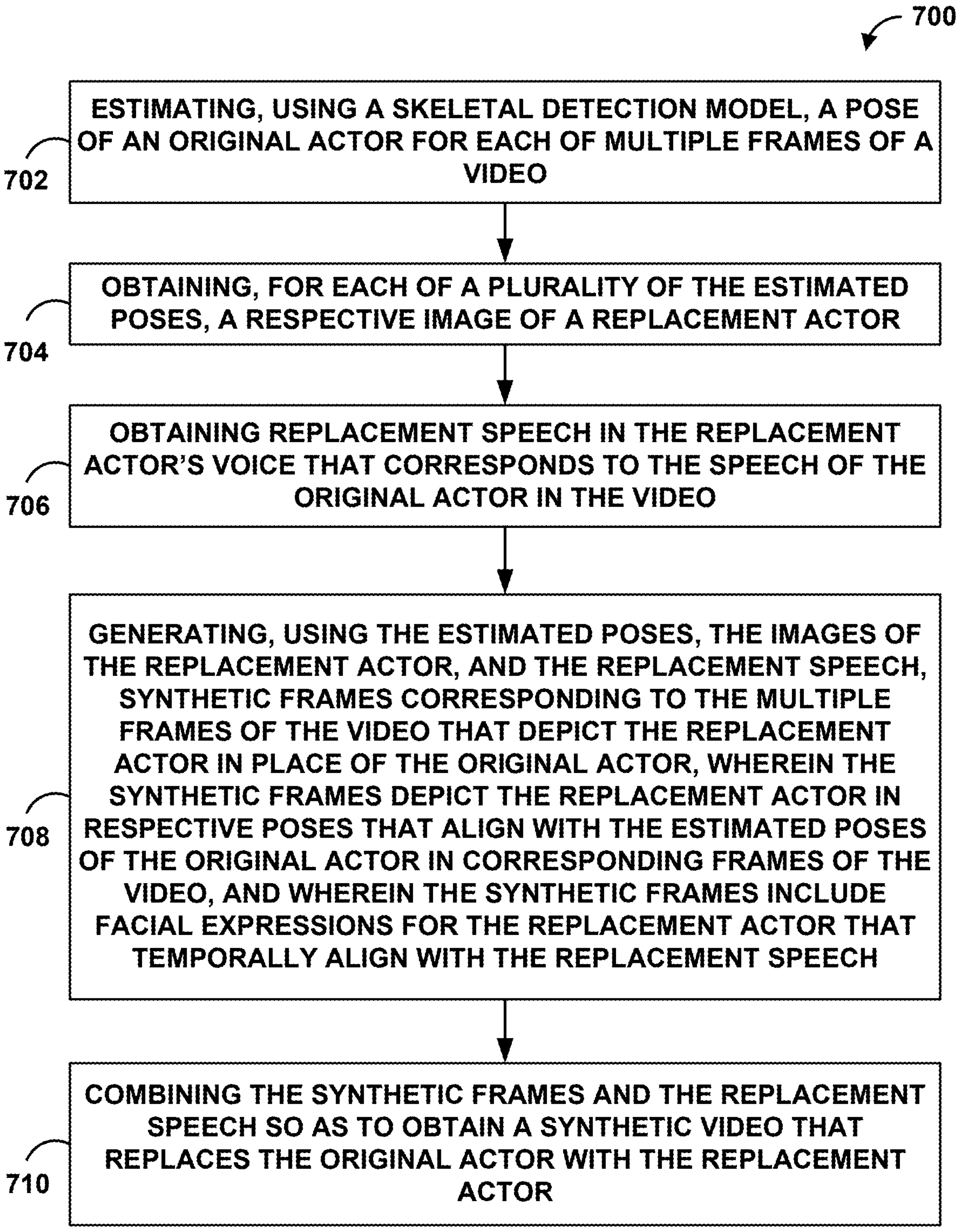
FIG. 7 is a flow chart of an example method.

FIG. 7 is a flow chart illustrating an example method 700. The method 700 can be carried out by a video-generation system, such as the video-generation system 100, or more generally, by a computing system. At block 702, the method 700 includes estimating, using a skeletal detection model, a pose of an original actor for each of multiple frames of a video. At block 704, the method 700 includes obtaining, for each of a plurality of the estimated poses, a respective image of a replacement actor. At block 706, the method 700 includes obtaining replacement speech in the replacement actor's voice that corresponds to the speech of the original actor in the video. At block 708, the method 700 includes generating, using the estimated poses, the images of the replacement actor, and the replacement speech, synthetic frames corresponding to the multiple frames of the video that depict the replacement actor in place of the original actor. The synthetic frames depict the replacement actor in respective poses that align with the estimated poses of the original actor in corresponding frames of the video. The synthetic frames also include facial expressions for the replacement actor that temporally align with the replacement speech. And at block 710, the method 700 includes combining the synthetic frames and the replacement speech so as to obtain a synthetic video that replaces the original actor with the replacement actor.

J. Second Example Method

Figure 8:
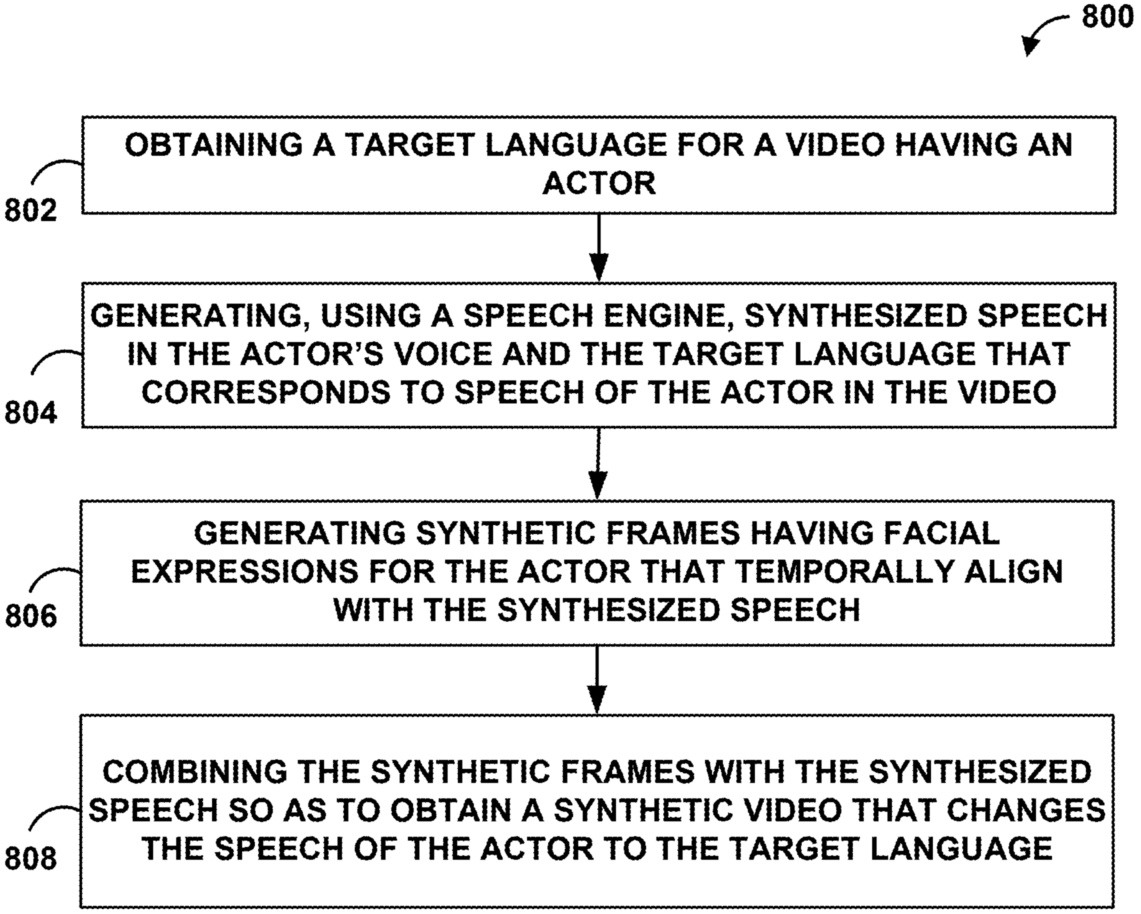
FIG. 8 is a flow chart of another example method.

FIG. 8 is a flow chart illustrating an example method 800. The method 800 can be carried out by a video-generation system, such as the video-generation system 200, or more generally, by a computing system. At block 802, the method 800 includes obtaining a target language for a video having an actor. At block 804, the method 800 includes generating, using a speech engine, synthesized speech in the actor's voice and the target language that corresponds to speech of the actor in the video. At block 806, the method 800 includes generating synthetic frames having facial expressions for the actor that temporally align with the synthesized speech. And at block 808, the method 800 includes combining the synthetic frames with the synthesized speech so as to obtain a synthetic video that changes the speech of the actor to the target language.

IV. Example Variations

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more examples of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A computing system comprising a processor and a non-transitory computer-readable medium having stored thereon program instructions that upon execution by the processor, cause performance of a set of acts comprising:

estimating, using a skeletal detection model, a pose of an original actor for each of multiple frames of a video;

obtaining, for each of a plurality of the estimated poses of the original actor, a respective image of a modified version of the original actor;

generating, using the estimated poses and the images of the modified version of the original actor, synthetic frames corresponding to the multiple frames of the video that depict the modified version of the original actor in place of the original actor, wherein the synthetic frames depict the modified version of the original actor in respective poses that align with the estimated poses of the original actor in corresponding frames of the video, and wherein the synthetic frames comprise facial expressions for the modified version of the original actor that temporally align with corresponding speech, wherein generating the synthetic frames further comprises providing the corresponding speech and the modified frame as input to a temporal generative adversarial network having an ensemble of discriminators, and wherein the ensemble of discriminators comprises a frame discriminator, a sequence discriminator, and a synchronization discriminator; and combining the synthetic frames and the corresponding speech so as to obtain a synthetic video that replaces the original actor with the modified version of the original actor.

2. The computing system of claim 1, wherein obtaining the images of the modified version of the original actor comprises estimating a pose of the modified version of the original actor for each of multiple frames of a sample video of the modified version of the original actor.

3. The computing system of claim 1, wherein obtaining the images of the modified version of the original actor comprises:

recording a sample video of the modified version of the original actor; and identifying poses of the modified version of the original actor during the sample video using a motion capture system.

4. The computing system of claim 1, wherein obtaining the images of the modified version of the original actor comprises rendering an image of the modified version of the original actor using a target pose, an image of the modified version of the original actor, and a pose rendering model.

5. The computing system of claim 1, wherein a difference between the original actor and the modified version of the original actor is in accordance with a storyline change.

6. The computing system of claim 1, wherein generating the synthetic frames further comprises, for the given frame, extracting the original actor from the given frame using the estimated poses of the original actor.

7. A method comprising:

estimating, by a computing system using a skeletal detection model, a pose of an original actor for each of multiple frames of a video;

obtaining, by the computing system for each of a plurality of the estimated poses of the original actor, a respective image of a modified version of the original actor;

generating, by the computing system using the estimated poses and the images of the modified version of the original actor, synthetic frames corresponding to the multiple frames of the video that depict the modified version of the original actor in place of the original actor, wherein the synthetic frames depict the modified version of the original actor in respective poses that align with the estimated poses of the original actor in corresponding frames of the video, and wherein the synthetic frames comprise facial expressions for the modified version of the original actor that temporally align with corresponding speech, wherein generating the synthetic frames further comprises providing the corresponding speech and the modified frame as input to a temporal generative adversarial network having an ensemble of discriminators, and wherein the ensemble of discriminators comprises a frame discriminator, a sequence discriminator, and a synchronization discriminator; and combining the synthetic frames and the corresponding speech so as to obtain a synthetic video that replaces the original actor with the modified version of the original actor.

8. The method of claim 7, wherein obtaining the images of the modified version of the original actor comprises estimating a pose of the modified version of the original actor for each of multiple frames of a sample video of the modified version of the original actor.

9. The method of claim 7, wherein obtaining the images of the modified version of the original actor comprises:

recording a sample video of the modified version of the original actor; and identifying poses of the modified version of the original actor during the sample video using a motion capture system.

10. The method of claim 7, wherein obtaining the images of the modified version of the original actor comprises rendering an image of the modified version of the original actor using a target pose, an image of the modified version of the original actor, and a pose rendering model.

11. The method of claim 7, wherein a difference between the original actor and the modified version of the original actor is in accordance with a storyline change.

12. The method of claim 7, wherein generating the synthetic frames further comprises, for the given frame, extracting the original actor from the given frame using the estimated poses of the original actor.

13. A non-transitory computer-readable medium having stored thereon program instructions that upon execution by a computing system, cause performance of a set of acts comprising:

estimating, using a skeletal detection model, a pose of an original actor for each of multiple frames of a video;

obtaining, for each of a plurality of the estimated poses of the original actor, a respective image of a modified version of the original actor;

generating, using the estimated poses and the images of the modified version of the original actor, synthetic frames corresponding to the multiple frames of the video that depict the modified version of the original actor in place of the original actor, wherein the synthetic frames depict the modified version of the original actor in respective poses that align with the estimated poses of the original actor in corresponding frames of the video, and wherein the synthetic frames comprise facial expressions for the modified version of the original actor that temporally align with corresponding speech, wherein generating the synthetic frames further comprises providing the corresponding speech and the modified frame as input to a temporal generative adversarial network having an ensemble of discriminators, and wherein the ensemble of discriminators comprises a frame discriminator, a sequence discriminator, and a synchronization discriminator; and combining the synthetic frames and the corresponding speech so as to obtain a synthetic video that replaces the original actor with the modified version of the original actor.

14. The non-transitory computer-readable medium of claim 13, wherein obtaining the images of the modified version of the original actor comprises estimating a pose of the modified version of the original actor for each of multiple frames of a sample video of the modified version of the original actor.

15. The non-transitory computer-readable medium of claim 13, wherein obtaining the images of the modified version of the original actor comprises:

recording a sample video of the modified version of the original actor; and identifying poses of the modified version of the original actor during the sample video using a motion capture system.

16. The non-transitory computer-readable medium of claim 13, wherein obtaining the images of the modified version of the original actor comprises rendering an image of the modified version of the original actor using a target pose, an image of the modified version of the original actor, and a pose rendering model.

17. The non-transitory computer-readable medium of claim 13, wherein a difference between the original actor and the modified version of the original actor is in accordance with a storyline change.

18. The non-transitory computer-readable medium of claim 13, wherein generating the synthetic frames further comprises, for the given frame, extracting the original actor from the given frame using the estimated poses of the original actor.

* * * * *